(12) United States Patent
Bhakar et al.

(10) Patent No.: US 10,491,673 B2
(45) Date of Patent: Nov. 26, 2019

(54) SYNCHRONIZATION OF CONVERSATION DATA

(71) Applicant: MICROSOFT TECHNOLOGY LICENSING, LLC, Redmond, WA (US)

(72) Inventors: Gautam Bhakar, Redmond, WA (US); Manish Garg, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/076,083

(22) Filed: Mar. 21, 2016

(65) Prior Publication Data

US 2016/0205186 A1    Jul. 14, 2016

Related U.S. Application Data

(63) Continuation of application No. 13/267,971, filed on Oct. 7, 2011, now Pat. No. 9,294,307.

(51) Int. Cl.
*H04L 29/08* (2006.01)
*G06Q 10/10* (2012.01)
*H04L 12/58* (2006.01)

(52) U.S. Cl.
CPC ....... *H04L 67/1095* (2013.01); *G06Q 10/107* (2013.01); *H04L 51/12* (2013.01); *H04L 51/16* (2013.01); *H04L 67/06* (2013.01)

(58) Field of Classification Search
CPC ... H04L 67/1095; H04L 12/586; H04L 67/06; H04L 51/12; H04L 12/585; H04L 51/16; G06Q 10/107

USPC ......................................... 709/206
See application file for complete search history.

(56) References Cited

U.S. PATENT DOCUMENTS

| | | | |
|---|---|---|---|
| 6,983,293 | B2 | 1/2006 | Wang |
| 7,243,163 | B1 * | 7/2007 | Friend ............... G06F 17/30575 |
| | | | 707/E17.032 |
| 7,359,920 | B1 | 4/2008 | Rybicki et al. |
| 7,650,394 | B2 | 1/2010 | Pearson et al. |
| 7,716,593 | B2 | 5/2010 | Durazo et al. |
| 7,870,205 | B2 | 1/2011 | LeVasseur et al. |
| 9,294,307 | B2 | 3/2016 | Bhakar et al. |
| 2005/0198087 | A1 | 9/2005 | Bremers |
| 2007/0271305 | A1 | 11/2007 | Chandrasekar et al. |

(Continued)

OTHER PUBLICATIONS

U.S. Appl. No. 13/267,971, Final Office Action, dated Dec. 12, 2014, 16 Pages.

(Continued)

*Primary Examiner* — Chris Parry
*Assistant Examiner* — Weiwei Y Stiltner
(74) *Attorney, Agent, or Firm* — Merchant & Gould P.C.

(57) ABSTRACT

Systems and methods for synchronizing conversation data between a client and a server in a networked computing environment. A data structure associated with an e-mail conversation is encoded and shuttled between the client and the server. When received at the server, the data structure is analyzed to determine changes within the e-mail conversation. The data structure is subsequently modified to reflect or include only those changes to minimize the amount of information transferred between the server and client.

19 Claims, 8 Drawing Sheets

(56) References Cited

U.S. PATENT DOCUMENTS

| | | | |
|---|---|---|---|
| 2008/0282355 A1* | 11/2008 | Nemazi | G06F 17/3012 726/26 |
| 2008/0317068 A1 | 12/2008 | Sagar et al. | |
| 2009/0131023 A1 | 5/2009 | Lorello et al. | |
| 2009/0183096 A1* | 7/2009 | Edelen | G06Q 10/107 715/764 |
| 2009/0327405 A1* | 12/2009 | FitzGerald | G06Q 10/10 709/203 |
| 2010/0100590 A1* | 4/2010 | Palay | G06Q 10/107 709/203 |
| 2011/0016189 A1 | 1/2011 | Buchheit et al. | |
| 2011/0143708 A1 | 6/2011 | Zellner et al. | |
| 2011/0258195 A1 | 10/2011 | Welling et al. | |
| 2011/0264627 A1 | 10/2011 | Lee et al. | |
| 2011/0295889 A1* | 12/2011 | Xu | G06Q 10/10 707/770 |
| 2011/0295958 A1* | 12/2011 | Liu | G06Q 10/10 709/206 |
| 2011/0320401 A1 | 12/2011 | Mahajan et al. | |
| 2012/0016904 A1 | 1/2012 | Mahajan et al. | |
| 2012/0066293 A1 | 3/2012 | Nakagawa | |
| 2012/0078913 A1 | 3/2012 | Muni et al. | |
| 2012/0124141 A1* | 5/2012 | Kroeger | H04L 51/16 709/206 |
| 2012/0221638 A1 | 8/2012 | Edamadaka et al. | |
| 2012/0331061 A1 | 12/2012 | Lininger | |
| 2013/0013921 A1* | 1/2013 | Bhathena | H04L 9/0825 713/168 |

OTHER PUBLICATIONS

U.S. Appl. No. 13/267,971, Final Office Action, dated Nov. 4, 2013, 30 Pages.
U.S. Appl. No. 13/267,971, Non-Final Office Action, dated Apr. 6, 2015, 16 Pages.
U.S. Appl. No. 13/267,971, Non-Final Office Action, dated Jun. 12, 2014, 16 Pages.
U.S. Appl. No. 13/267,971, Non-Final Office Action, dated Mar. 25, 2013, 24 Pages.
U.S. Appl. No. 13/267,971, Notice of Allowance, dated Nov. 12, 2015, 13 Pages.
"Introduction to Microsoft Sync Framework File Synchronization Provider"; Oct. 2009; 5 pages.
Yates et al.; "Using Email Threads to Coordinate Distributed Work"; Nov. 27, 2006; 61 pages.

* cited by examiner

SYNCHRONIZATION OF CONVERSATION DATA

RELATED APPLICATIONS

This application is a continuation of U.S. patent application Ser. No. 13/267,971, filed Oct. 7, 2011, entitled "Synchronization of Conversation Data," now U.S. Pat. No. 9,294,307, which is hereby incorporated by reference.

BACKGROUND

An e-mail conversation is typically an aggregate of e-mail messages that are grouped together based on one or more common factors such as, for example, subject, recipient(s), etc. Depending on the type and the volume of the content contained therein, synchronizing full conversations between a client and a server can be inefficient, both for the client and the server. For example, it may be necessary to send a completely new copy of a message from the server to the client when only a portion of the conversation is updated. Accordingly, it may be desirable to synchronize communications data associated with an e-mail conversation in a manner that minimizes impact on those resources.

SUMMARY

In one aspect, a method for synchronizing communication data in a networked computing environment is disclosed. The method includes: receiving, at a first computing device, a request to synchronize communication data between a first application executing at least in part on the first computing device and another application executing at least in part on a second device in the networked computing environment; analyzing content of the request and identifying at least one message linked to the content; retrieving a plurality of information associated with the at least one message; encoding at least a portion of the plurality of information into a first electronic file, wherein the first electronic file comprises a binary large object; and sending the first electronic file from the first computing device to the second device to synchronize communication data associated with the at least one message.

In another aspect, a method for synchronizing communication data between a client device and a server device in a networked computing environment is disclosed. The method includes: sending, from the client device to the server device, a first request message to synchronize communication data between a first application executing at least in part on the client device and another application executing at least in part on the server device; receiving a first response message at the client device in reply to the first request message, the first response message encoding a first tree structure that includes a first plurality of nodes each storing at least a conversation identifier that identifies a specific conversation associated with a corresponding message of a first plurality of messages, and a message identifier that specifically identifies the corresponding message of the first plurality of messages; and storing the first tree structure in a predetermined memory location to synchronize communication data of a conversation associated with the first plurality of messages.

In yet another aspect, a computing device including a processing unit and a system memory connected to the processing unit is disclosed. The system memory including instructions that, when executed by the processing unit, cause the processing unit to implement a sync module and a server mapping module configured to synchronize communication data between at least one client device and at least one server device in a networked computing environment. The sync module being configured to: generate a tree structure in response to a synchronization request received from the at least one client device, the tree structure including a plurality of nodes, each node storing at least a portion of a plurality of information associated with each one of a plurality of messages associated with the synchronization request, the plurality of information selected from: a conversation identifier that identifies a specific conversation associated with a corresponding message of the plurality of messages; a message identifier that specifically identifies a corresponding message of the plurality of messages; and text associated with a corresponding message of the plurality of messages; and the server mapping module being configured to: encode the tree structure as a binary large object to form an encoded electronic file; and send the encoded electronic file to the client device to synchronize communication data associated with the plurality of messages.

This Summary is provided to introduce a selection of concepts, in a simplified form, that are further described below in the Detailed Description. This Summary is not intended to be used in any way to limit the scope of the claimed subject matter. Rather, the claimed subject matter is defined by the language set forth in the Claims of the present disclosure.

DETAILED DESCRIPTION

The present disclosure is directed to providing efficient systems and methods for synchronizing conversation data between a client and a server. In the examples described, the conversation data includes two or more e-mail messages that are grouped in some manner, such as by belong to the same message string (e.g., reply, forward, etc.).

Figure 1:
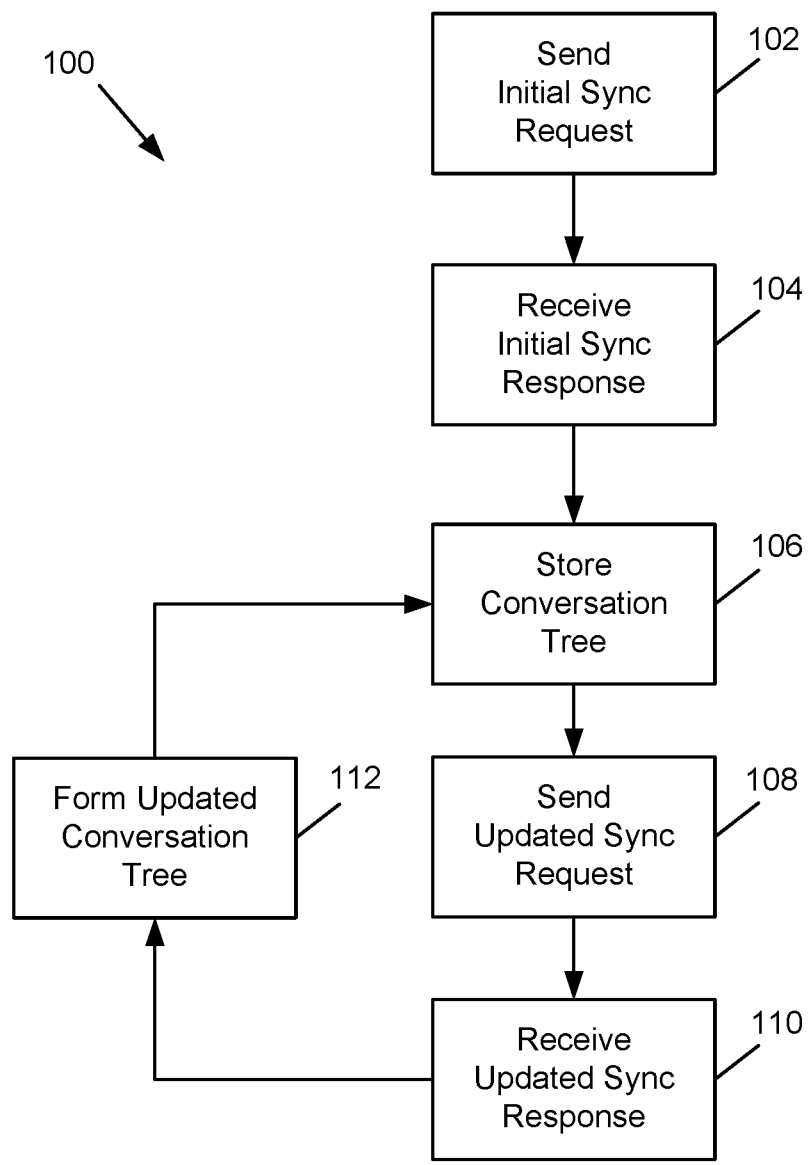
FIG. 1 shows a flowchart for a first example method for synchronizing conversation data between a client and a server.

For example, referring now to FIG. 1, a first example method 100 for synchronizing conversation data between a client and a server is shown. In the following example embodiment, the method 100 is at least partially implemented on or by a client computing device in a networked computing environment, such as described below in connection with FIGS. 2-4. Other embodiments are possible.

The method 100 begins at a first module 102. The first module 102 is configured to send an initial sync request (ISRQ) from the client to the server. The ISRQ is sent to the server when the client wants to synchronize an e-mail conversation associated with a particular user's mailbox for the first time. The ISRQ includes an identifier that uniquely identifies the e-mail conversation. For example, assuming an example message sequence A→B→C throughout and assuming only message A currently exists, the ISRQ includes a conversation identifier (e.g., "convID1") that identifies the particular e-mail conversation associated with message A.

Operational flow then proceeds to a second module 104. The second module 104 is configured to receive an initial sync response (ISRS) at the client from the server in reply to the ISRQ. The ISRS includes at least the conversation identifier, and an initial binary large object (BLOB), also referred to as a SynchState, that concisely encodes a conversation tree that encapsulates the full e-mail conversation. In the current example, the conversation tree only includes a single node A. The node A includes a message identifier A (e.g., "messIDA") that uniquely identifies message A. The node A also includes text content of message A inserted within the body of the same by the particular user. An example of text content included within the body of message A includes: "This is a message for you. Please respond."

Operational flow then proceeds to a third module 106. The third module 106 is configured to store the conversation tree and its associated content(s) in memory on the client. In the current example, when the particular user wants to view message A, the text content stored within node A is accessed and rendered by the client within message A. In this manner, an enhanced performance is perceived by the particular user as the message A is retrieved from local memory on the client, as opposed to the server over a network.

Operational flow then proceeds to a fourth module 108. The fourth module 108 is configured to send an updated sync request (USRQ) from the client to the server. The USRQ is sent to the server when the client wants to synchronize back changes inside of the e-mail conversation. In the current example, the USRQ includes the conversation identifier that uniquely identifies the subject e-mail conversation, as well as a "reduced" BLOB in which the full conversation tree stored in memory on the client is retrieved and each node (e.g., node A) of the conversation tree is re-populated to only include the conversation identifier (e.g., convID1) and associated message identifier (e.g. messIDA). In this manner, the amount of information transferred from the client to the server as part of the example method 100 for synchronizing conversation data between the client and server is minimized.

Operational flow then proceeds to a fifth module 110. The fifth module 110 is configured to receive an updated sync response (USRS) at the client from the server in response to the USRQ. The USRS includes the conversation identifier, along with an updated BLOB. In example embodiments, the updated BLOB includes a modified conversation tree that reflects any new or modified messages associated with the e-mail conversation.

For example, and assuming that only messages A and B of the example message sequence A→B→C currently exist, the updated BLOB includes the node A and a new node B. The node B includes a message identifier B that uniquely identifies message B. The node B also includes text content of message B inserted within the body of the same by another particular user in response to message A (e.g., "This is in response to your message."). However, node A within the updated BLOB is returned to the client from the server only with the message identifier A, and not the text content of message A. This is because the client already has the text content of message A stored in local memory. In this manner, the amount of information transferred from the server to the client as part of the example method 100 for synchronizing conversation data between the client and server is minimized.

Operational flow then proceeds to a sixth module 112. The sixth module is configured to merge the modified conversation tree with the conversation tree currently stored on the client to form an updated conversation tree. In the current example, the updated conversation tree includes node A and node B. Node A is populated with both the message identifier A and associated text content (e.g., "This is a message for you. Please respond."), and node B is populated with both the message identifier B and associated text content (e.g., "This is in response to your message."). When the particular user wants to view message A, the text content stored within node A is accessed and rendered by the client within message A, as described above. When the particular user wants to view message B, the text content stored within node A and node B is accessed and rendered by the client within the message B. This is because message B is a reply to message A in the example message sequence A→B→C.

Operational flow then returns to the third module 106, where the updated conversation tree and its associated content(s) are stored in memory on the client. Operational flow then proceeds in a loop between the respective modules 106, 108, 110, and 112. In this manner, the example method 100 periodically or at least intermittently synchronizes conversation data of the subject e-mail conversation between the client and the server.

For example, assuming that message C now exists and message B of the example message sequence A→B→C is newly deleted, an updated BLOB received at the fifth module 110 as operational flow proceeds through the noted loop includes node A, node B, and a new node C. The node C includes a message identifier C that uniquely identifies message C. The node C also includes text content of message C inserted within the body of the same by the particular user in response to message B (e.g., "Thank you for the response."). However, node A within the updated BLOB is returned to the client from the server only with message identifier A, and node B within the updated BLOB is returned as empty. This is because the client already has the text content of message A stored in local memory. Additionally, the lack of information in node B designates that the associated content has been deleted from the subject e-mail conversation. However, other embodiments are possible. For example, in some embodiment, the node B itself is deleted from the updated BLOB to designate deletion of the message B of the subject e-mail conversation. Such an example implementation further minimizes the amount of information transferred from the server to the client as part of the example method 100 for synchronizing conversation data between the client and server.

Although not so limited, one example implementation of a system and method for synchronizing conversation data between a client and a server is described in further detail below in connection with FIGS. 2-8.

Figure 2:
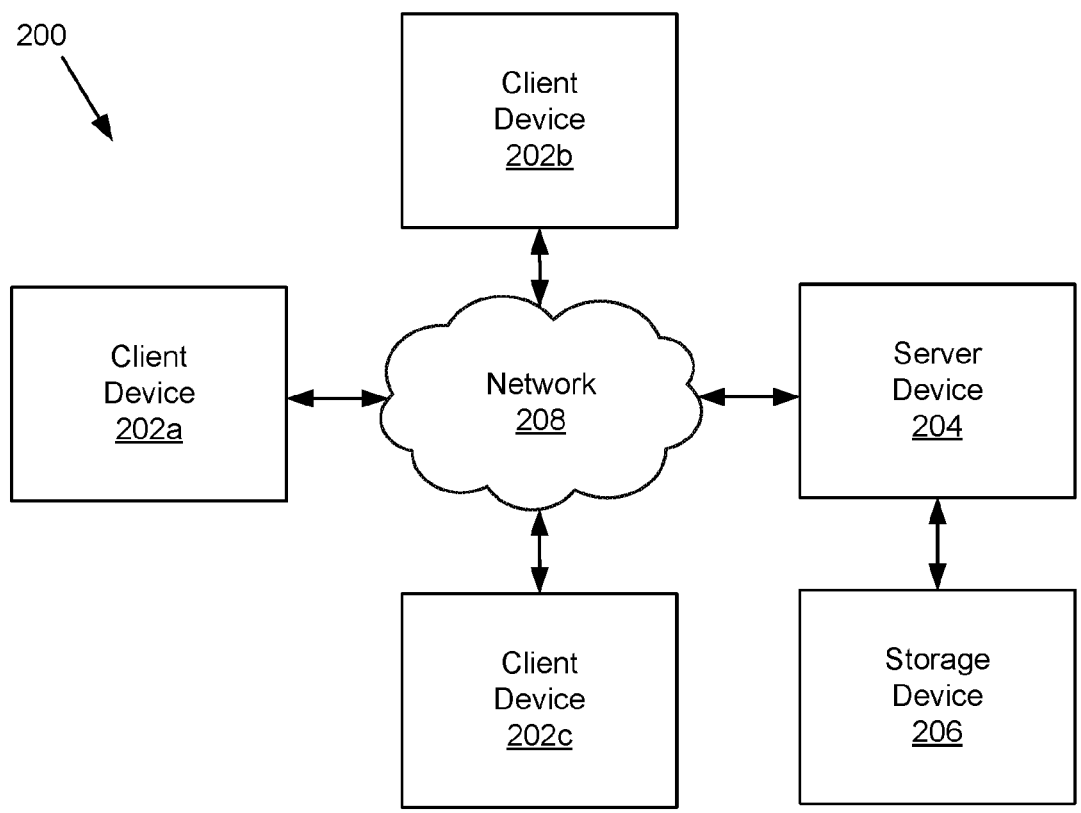
FIG. 2 shows an example networked computing environment.

Referring now to FIG. 2, an example networked computing environment 200 is shown in which aspects of the present disclosure may be implemented, including the example method 100 of FIG. 1. The example environment 200 includes a plurality of client devices 202*a-c* (collectively, "client device 202"), a server device 204, a storage device 206, and a network 208. Other embodiments are possible. For example, the environment 200 may generally include more or fewer devices, networks, and other components as desired.

The client device 202 and the server device 204 are computing devices, as described in further detail below in connection with FIG. 3. In example embodiments, the client device 202 is configured for accessing and interacting with business processes as implemented by the server device 204. Example business processes include messaging and communications process, collaboration processes, data management processes, and others. Exchange Server, from Microsoft Corporation of Redmond, Wash., is an example of a business server that implements messaging and communications business processes in support of electronic mail, calendaring, and contacts and tasks features, in support of mobile and web-based access to information, and in support of data storage. Other business processes are possible.

In some embodiments, the server device 204 includes of a plurality of interconnected, networked server devices operating together in a "Farm" configuration to implement business processes. In such a scenario, the network can provide a "cloud" computing platform in which one or more applications and data are hosted for one or more clients connected to the cloud computing platform. Still other embodiments are possible.

The storage device 206 is an electronic data storage device, such as a relational database or any other type of persistent data storage device. The storage device 206 stores data in a predefined format such that the server device 204 can query, modify, and manage electronic data stored thereon. Example electronic data includes information related to directory services, authentication services, administration services, and other services such as managed by the ACTIVE DIRECTORY® directory service from Microsoft Corporation.

The network 208 is a bi-directional data communication path for data transfer between one or more devices. In the example shown, the network 208 establishes a communication path for data transfer between the client device 202 and the server device 204. The network 208 can be of any of a number of wireless or hardwired WAN, LAN, Internet, or other packet-based communication networks such that data can be transferred among the elements of the example environment 200.

Figure 3:
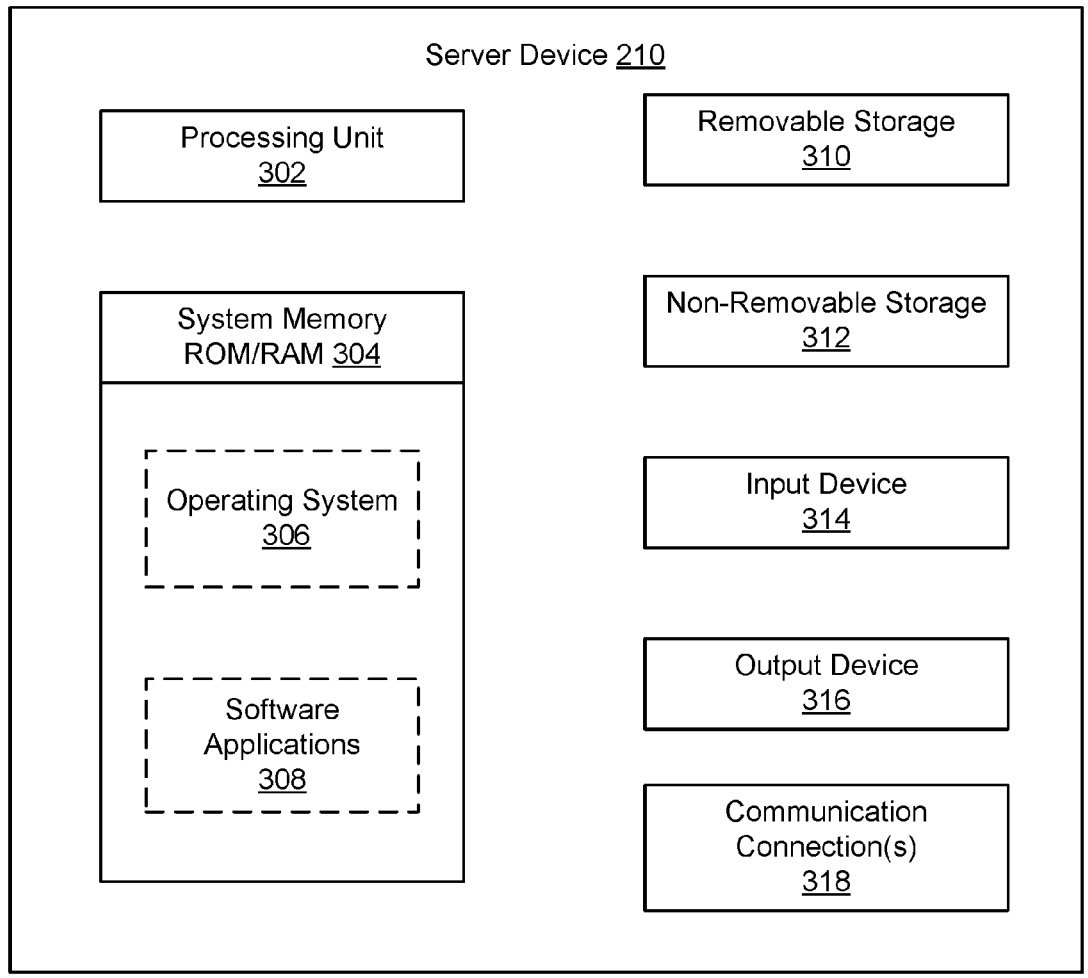
FIG. 3 shows an example configuration of the server device of FIG. 2.

Referring now to FIG. 3, the server device 204 of FIG. 2 is shown in detail. As mentioned above, the server device 204 is a computing device. An example computing device includes an enterprise server, blade server, desktop computer, laptop computer, personal data assistant, smartphone, gaming console, and others.

The server device 204 includes at least one processing unit 302 and a system memory 304. The system memory 304 stores an operating system 306 for controlling the operation of the server device 204 or another computing device. One example operating system is the WINDOWS® operating system from Microsoft Corporation. Other embodiments are possible.

The system memory 304 includes one or more software applications 308 and may include program data. Software applications 308 may include many different types of single and multiple-functionality programs, such as a server program, an electronic mail program, a calendaring program, an Internet browsing program, a spreadsheet program, a program to track and report information, a word processing program, and many others.

One example program is the Office suite of business applications from Microsoft Corporation. Another example program includes Exchange Server, also from Microsoft Corporation. Exchange Server is an example of a business server that implements messaging and collaborative business processes in support of electronic mail, calendaring, and contacts and tasks features, in support of mobile and web-based access to information, and in support of data storage. Still other programs are possible.

The system memory 304 is computer-readable media. Examples of computer-readable media include computer-readable storage media and communication media. Computer-readable storage media is physical media that is distinguished from communication media.

The phrase "computer-readable" generally refers to information that can be interpreted and acted on by a computer or computing device. The phrase "storage media" or, equivalently, "storage medium" refers to the various types of physical or tangible material on which data bits are written and stored. Since it is not possible to store information in a transient signal, "computer-readable storage media" as defined within the context of the present disclosure excludes transient signals.

Computer-readable storage media includes physical volatile and nonvolatile, removable and non-removable media implemented in any method or technology for storage of information, such as computer-readable instructions, data structures, program modules, or other data. Computer storage media also includes, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the server device 204. Any such computer storage media may be part of or external to the server device 204. Such storage is illustrated in FIG. 3 by removable storage 310 and non-removable storage 312.

Communication media is typically embodied by computer-readable instructions, data structures, program modules, or other data, in a transient modulated data signal, such as a carrier wave or other transport mechanism, and includes any information delivery media. The term "modulated data signal" refers to a signal that has one or more of its characteristics set or changed in such a manner as to encode information in the signal. By way of example, communication media includes wired media such as a wired network or direct-wired connection, and wireless media such as acoustic, RF, infrared and other wireless media.

The server device 204 also includes any number and type of an input device 314 and output device 316. An example input device 314 includes a keyboard, mouse, pen, voice input device, touch input device, motion input device, and others. For example, the input device 314 may be a camera that may be operative to record a user and capture motions and/or gestures made by a user. The input device 314 may be further operative to capture words spoken by a user, such as by a microphone, and/or capture other inputs from user such as by a keyboard and/or mouse. Consistent with embodiments of the present disclosure, the input device 314 may comprise any motion detection device capable of detecting the movement of a user. For example, the input device 314 may comprise a Kinect® motion capture device, from Microsoft Corporation, comprising a plurality of cameras and a plurality of microphones. Other embodiments are possible.

An example output device 316 includes a display, speakers, printer, and others. The server device 204 also includes a communication connection 318 configured to enable communications with other computing devices over a network (e.g., network 208 of FIG. 2) in a distributed computing system environment.

Figure 4:
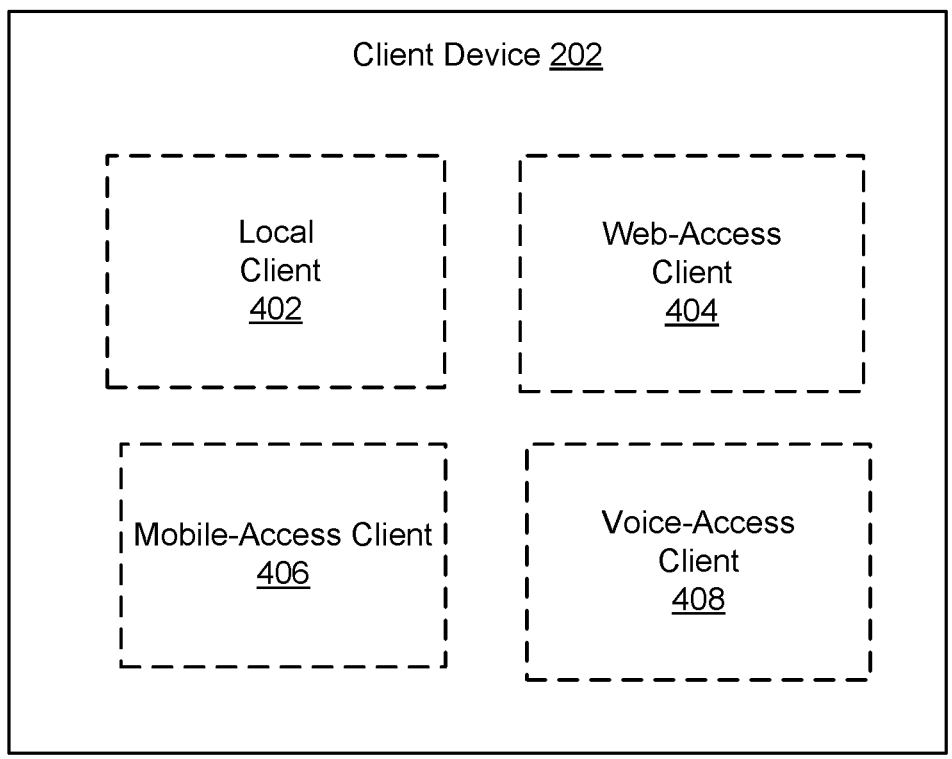
FIG. 4 shows example logical modules of the client device of FIG. 2.

The client device 202 of FIG. 2 is also a computing device and is configured in a manner similar to that of the server device 204 described above in connection with FIG. 3. Referring now to FIG. 4, the client device 202 is also configured to include one or more different types of client interfaces to the server device 204. In the example shown, the client device 202 includes a local client 402, a web-access client 404, a mobile-access client 406, and a voice-access client 408. Other types of client interfaces to the server device 204 are possible.

The local client 402 is configured as a dedicated messaging and collaboration client that serves as an interface to the server device 204, and is part of a suite of applications executing on the client device 202. In one embodiment, the local client 402 includes the OUTLOOK® messaging and collaboration client, which is an e-mail application that is part of the Office suite of business applications from Microsoft Corporation. A user can compose, interact with, send and receive e-mails with the OUTLOOK® messaging and collaboration client. Other embodiments of the local client 402 are possible. For example, in one embodiment, the local client 402 includes the Office Communicator client from Microsoft Corporation, an instant messaging client used with Office Communications Server.

The web-access client 404 is configured to accesses the server device 204 remotely via a network connection, such as the Internet. In one embodiment, the web-access client 404 is the Outlook Web Access (OWA) webmail service of Exchange Server. In the example embodiment, the client device 202 uses a web browser to connect to Exchange Server via Outlook Web Access. This brings up a user interface similar to the interface in the OUTLOOK® messaging and collaboration client in which a user can compose, interact with, send and receive e-mails. Other embodiments of the web-access client 404 are possible. For example, the web-access client 404 may be configured to connect to SHAREPOINT® collaboration server to access corresponding collaboration, file sharing and web publishing services.

The mobile-access client 406 is another type of client interface to the server device 204. In one embodiment, the mobile-access client 406 includes the Mobile Access with ACTIVESYNC® synchronization technology or the Windows Mobile Device Center for WINDOWS VISTA® operating system or Windows 7 operating system, all from Microsoft Corporation. Example mobile devices include a cellular telephone, smartphone, a personal digital assistant, and others. Other embodiments of the mobile-access client 406 are possible.

The voice-access client 408 is yet another type of client interface to the server device 204. In some embodiments, the voice-access client 408 includes Exchange Unified Messaging that is supported in Exchange Server. With Unified Messaging, users have one inbox for e-mail and voicemail. Voicemails are delivered directly into the OUTLOOK® messaging and collaboration client inbox. The message containing the voicemails may also include an attachment. Other embodiments of the voice-access client 408 are possible.

Figure 5:
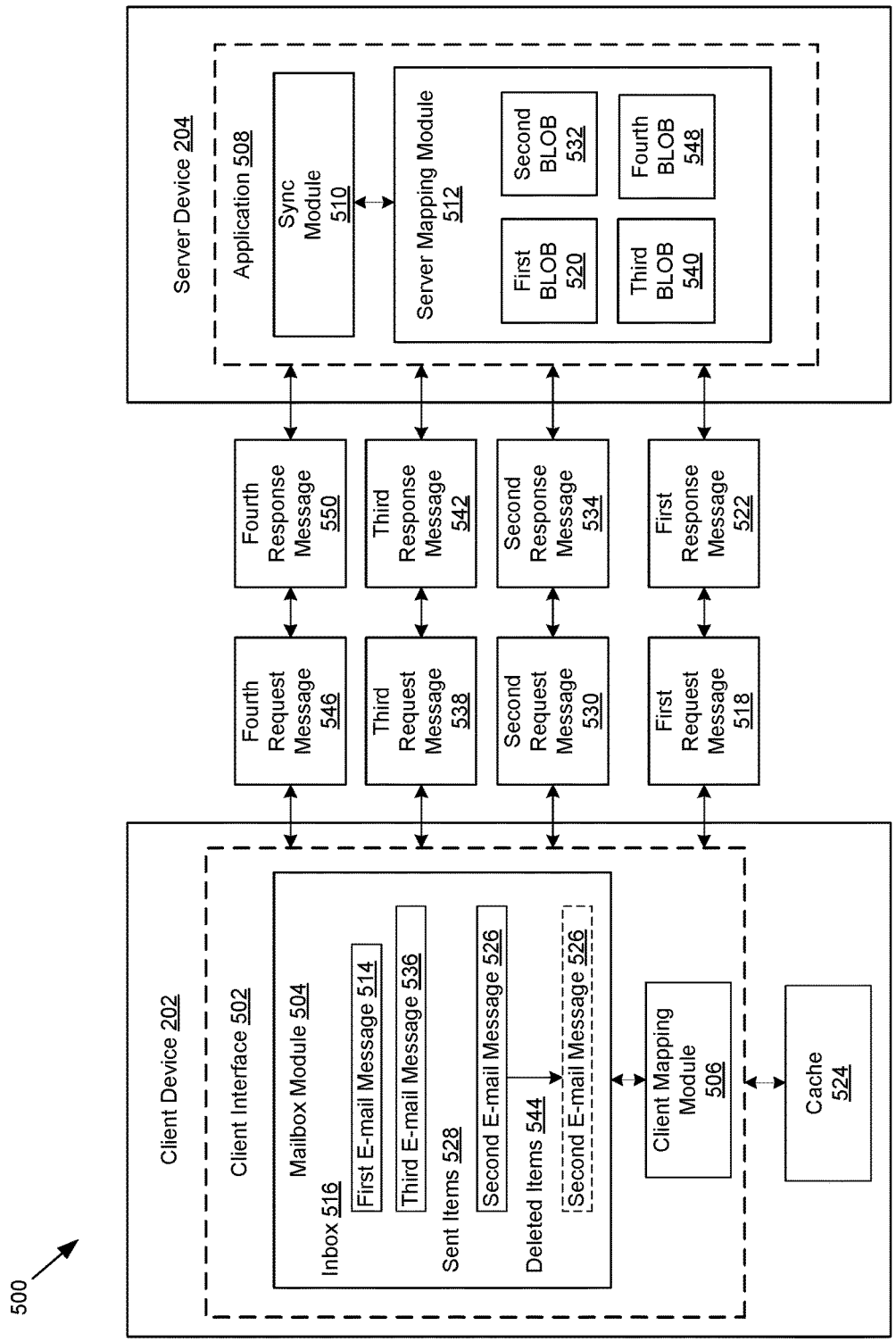
FIG. 5 shows an example diagram illustrating example communications between the client device and server device of FIG. 2.

Referring now to FIG. 5, an example block diagram 500 illustrates example communications between computing devices to synchronize conversation data between the same in accordance with the present disclosure. Specifically, the block diagram 500 includes the client device 202 and the server device 204 described above in connection with FIGS. 2-4. However, other configurations are possible. For example, the block diagram 500 may generally include more or fewer devices and/or other components as desired.

The client device 202 includes a client interface 502 similar to the client interfaces described above in connection with FIG. 4. In the example shown, the client interface 502 further includes a mailbox module 504 and a client mapping module 506 each configured to generally enable synchronization of conversation data with the server device 204. The server device 204 includes a business server application 508 that at least implements messaging and communications processes in support of e-mail (e.g., an Exchange Server implementation). In example embodiments, the application 508 further includes a sync module 510 and a server mapping module 512 configured to generally enable synchronization of conversation data with the client device 202. Other embodiments are possible.

In a first example scenario, a first e-mail message 514 is initially received within an inbox folder 516 of the mailbox module 504.

Figure 6:
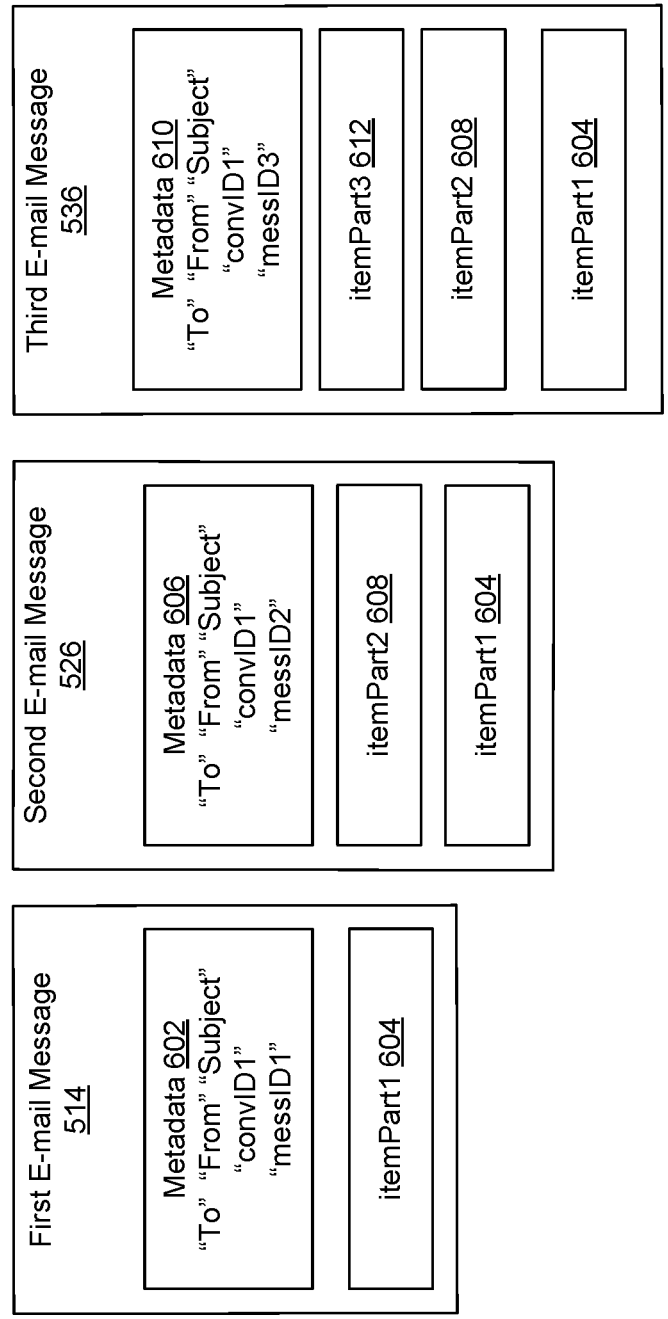
FIG. 6 shows example details of a plurality of messages sent between the devices of FIG. 5.

Referring now to FIG. 6, the example first e-mail message 514 includes content such as first metadata 602 and a first itemPart 604 ("itemPart1") that is composed of text within the body of the first e-mail message 514. First metadata 602 at least includes a "To" or recipient SMTP address, a "From" or sender SMTP address, a subject "Subject" corresponding to text of a subject line of the first e-mail message 514, a conversation identifier "convID1" specific to a conversation or thread associated with the first e-mail message 514, and a message identifier "messID1" specific to the first e-mail message 514. Other metadata are possible as well.

Referring now back to FIG. 5, when the mailbox module 504 wants to synchronize conversation data associated with first e-mail message 514 for the first time, the client interface 502 sends a first request message 518 to the application 508. In response, the sync module 510 of the application 508 generates a conversation tree that encapsulates the full conversation associated with the first e-mail message 514. In the current example, the mailbox module 504 only initially includes the first e-mail message 514, and therefore the sync module 510 generates a conversation tree that includes a single node.

Figure 7:
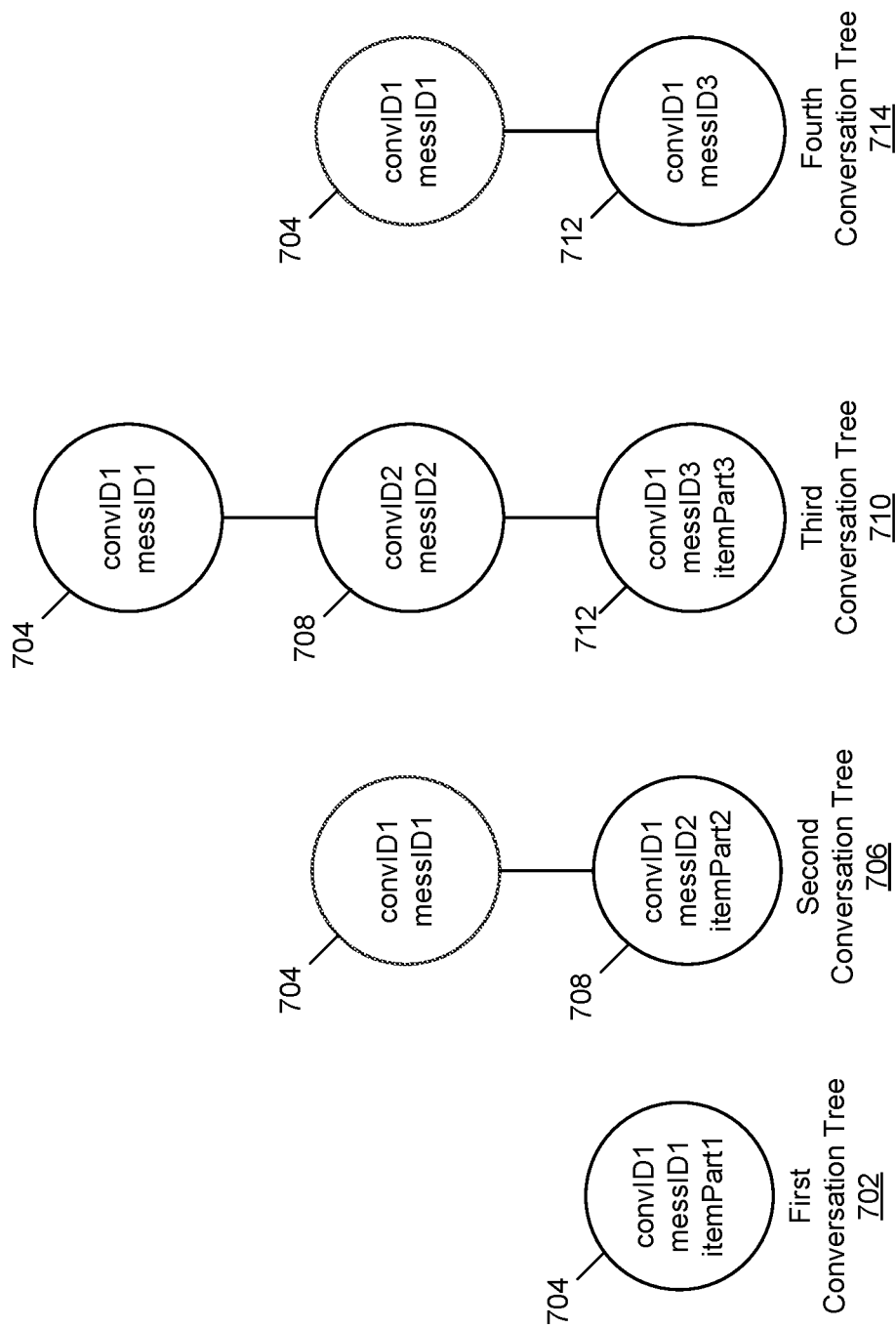
FIG. 7 shows a plurality of conversation trees generated in accordance with the example communications of FIG. 5.

For example, referring now to FIG. 7, a first conversation tree 702 generated by the sync module 510 includes a first node 704 that includes the conversation identifier (convID1), message identifier (messID1), and itemPart (itemPart1) specific to the first e-mail message 514.

Referring now back to FIG. 5, the sync module 510 transfers the first conversation tree 702 to the server mapping module 512 following generation of the first conversation tree 702. The server mapping module 512 then generates a first BLOB 520 that encodes the first conversation tree 702. The application 508 then sends a first response message 522 to the client interface 502 that includes the first BLOB 520. The client mapping module 506 of the client interface 502 then decodes the first BLOB 520 and stores the first conversation tree 702 in a cache memory 524 on the client device 202. When an approved user wants to view the first e-mail message 514, the mailbox module 504 accesses at least the first itemPart 604 stored within the first node 704 in the cache memory 524 and renders the same within the first e-mail message 514 via the mailbox module 504. Other embodiments are possible.

In a second example scenario, the first e-mail message 514 is forwarded such that the mailbox module 504 includes a second e-mail message 526 located within a sent items folder 528 of the mailbox module 504.

Referring now to FIG. 6, the second e-mail message 526 includes content such as second metadata 606 and a second itemPart 608 ("itemPart2") that is composed of text added to the body of the second e-mail message 526. The second e-mail message 526 further includes the first itemPart 604 of the first e-mail message 514 as the second e-mail message 526 is a forwarded version of the first e-mail message 514. Second metadata 606 at least includes a "To" or recipient SMTP address, a "From" or sender SMTP address, a subject "Subject" corresponding to text of a subject line of the second e-mail message 526, a conversation identifier "convID1" specific to a conversation or thread associated with the second e-mail message 526, and a message identifier "messID2" specific to the second e-mail message 526. Other metadata are possible as well.

Referring now back to FIG. 5, when the client interface 502 wants to synchronize back changes inside of the subject e-mail conversation, the client interface 502 sends a second request message 530 to the application 508. In example embodiments, the second request message 530 includes a "reduced" version of the first BLOB 520 in which the first conversation tree 702 is retrieved from the cache memory 524 on the client device 202 and modified such that each node (e.g., first node 704) of the first conversation tree 702 is populated to only include the associated conversation identifier and/or message identifier (e.g. convID1, messID1). Other embodiments are possible. For example, in some embodiments, the client interface 502 does not alter the first conversation tree 702, and instead sends the first BLOB 520 to the application 508 without modification. In this example embodiment, any BLOB transferred from the client device 202 to the server device 204 is an exact version of a BLOB previously received from the server device 204.

In response, the sync module 510 of the application 508 generates a conversation tree that encapsulates the full conversation associated with the second e-mail message 526. In the current example, the mailbox module 504 now includes the first e-mail message 514 and the second e-mail message 526, and therefore the sync module 510 generates a conversation tree that includes a pair of nodes.

For example, referring now to FIG. 7, a second conversation tree 706 generated by the sync module 510 includes the first node 704 associated with the first e-mail message 514 and a second node 708 that includes the conversation identifier (convID1), message identifier (messID2), and itemPart (itemPart2) specific to the second e-mail message 526. However, the first node 704 associated with the first e-mail message 514 only includes the associated conversation identifier (convID1) and message identifier (messID1). The first itemPart 604 is omitted by the application 508 because the mailbox module 504 already has access to the content of the first itemPart 604, which is stored in the cache memory 524 as described above.

Referring now back to FIG. 5, the sync module 510 then transfers the second conversation tree 706 to the server mapping module 512. The server mapping module 512 generates a second BLOB 532 that encodes the second conversation tree 706. The application 508 then sends a second response message 534 that includes the second BLOB 532 to the client interface 502. The client mapping module 506 decodes the second BLOB 532, merges the second conversation tree 706 with the first conversation tree 702 to form an updated conversation tree, and stores the updated conversation tree in the cache memory 524. When an approved user wants to view the second e-mail message 526, the mailbox module 504 accesses at least the first itemPart 604 stored within the first node 704, and the second itemPart 608 within the second node 708 of the updated conversation tree, and renders the same within the second e-mail message 526. Other embodiments are possible.

In a third example scenario, a third e-mail message 536 is received within the inbox folder 516 of the mailbox module 504. In this example, the third e-mail message 536 is a reply to the second e-mail message 526.

Referring now to FIG. 6, the third e-mail message 536 includes content such as third metadata 610 and a third itemPart 612 ("itemPart3") that is composed of text added to the body of the third e-mail message 536. The third e-mail message 536 further includes the first itemPart 604 of the first e-mail message 514, and the second itemPart 608 of the second e-mail message 526, as the third e-mail message 536 is a response to the second e-mail message 526. Third metadata 610 at least includes a "To" or recipient SMTP address, a "From" or sender SMTP address, a subject "Subject" corresponding to text of a subject line of the third e-mail message 536, a conversation identifier "convID1" specific to a conversation or thread associated with the third e-mail message 536, and a message identifier "messID3" specific to the third e-mail message 536, and other information as desired. Other metadata are possible as well.

Referring now back to FIG. 5, when the client interface 502 wants to synchronize back changes inside of the subject e-mail conversation, the client interface 502 sends a third request message 538 to the application 508. In example embodiments, the third request message 538 includes a reduced version of the second BLOB 532 in which the updated conversation tree is retrieved from the cache memory 524 on the client device 202 and modified such that each node (e.g., first node 704, second node 708) of the conversation tree is populated to only include the associated conversation identifier and/or message identifier (e.g. convID1, messID1; convID1, messID2).

In response, the sync module 510 of the application 508 generates a conversation tree that encapsulates the full conversation associated with the third e-mail message 536. In the current example, the mailbox module 504 now includes the first e-mail message 514, second e-mail message 526, and third e-mail message 536, and therefore the sync module 510 generates a conversation tree that includes three nodes.

For example, referring now to FIG. 7, a third conversation tree 710 generated by the sync module 510 includes the first node 704 associated with the first e-mail message 514, the second node 708 associated with the second e-mail message 526, and a third node 712 that includes the conversation identifier (convID1), message identifier (messID3), and itemPart (itemPart3) specific to the third e-mail message 536. However, the first node 704 associated with the first e-mail message 514 and the second node 708 associated with the second e-mail message 526 only include the corresponding conversation identifier (convID1; convID1) and message identifier (messID1; messID2) at least for reasons similar to those provided above.

Referring now back to FIG. 5, the sync module 510 then transfers the third conversation tree 710 to the server mapping module 512. The server mapping module 512 generates a third BLOB 540 that encodes the third conversation tree 710. The application 508 then sends a third response message 542 that includes the third BLOB 540 to the client interface 502. The client mapping module 506 decodes the third BLOB 540, merges the third conversation tree 710 with the previously modified conversation tree located in the cache memory 524 to form an updated conversation tree, and stores the updated conversation tree in the cache memory 524. When an approved user wants to view the third e-mail message 536, the mailbox module 504 accesses at least the first itemPart 604 stored within the first node 704, the second itemPart 608 within the second node 708, and the third itemPart 612 within the third node 712 of the updated conversation tree and renders the same within the third e-mail message 536. Other embodiments are possible.

In a fourth example scenario, the second e-mail message 526 is deleted from the sent items folder 528 of the mailbox module 504. In this example, the second e-mail message 526 is removed from the sent items folder 528 and placed into a deleted items folder 544 of the mailbox module 504. Now, when the client interface 502 wants to synchronize back changes inside of the subject e-mail conversation, the client interface 502 sends a fourth request message 546 to the application 508. In example embodiments, the fourth request message 546 includes a reduced version of the third BLOB 540 in which the updated conversation tree is retrieved from the cache memory 524 on the client device 202 and modified such that each node (e.g., first node 704, second node 708, and third node 712) of the conversation tree is populated to only include the associated conversation identifier and/or message identifier (e.g. convID1, messID1; convID1, messID2; convID1, messID3).

In response, the sync module 510 of the application 508 generates a conversation tree that encapsulates the full conversation associated with first e-mail message 514, second e-mail message 526, and third e-mail message 536. However, in the current example, the mailbox module 504 now only includes the first e-mail message 514 and third e-mail message 536 as active messages, since the second e-mail message 526 has been deleted (but not yet purged from the mailbox module 504). Therefore, in the example embodiment, the sync module 510 generates a conversation tree that only includes a pair of nodes.

For example, referring now again to FIG. 7, a fourth conversation tree 714 generated by the sync module 510 includes the first node 704 associated with the first e-mail message 514, and the third node 712 associated with the third e-mail message 536. However, the first node 704 associated with the first e-mail message 514, and the third node 712 associated with the third e-mail message 536, only include the corresponding conversation identifier (convID1; convID1) and message identifier (messID1; messID3) at least for reasons similar to those provided above.

In the example embodiment, the second node 708 is omitted by the application 508 because the second e-mail message 526 has been deleted in the example scenario. Other embodiments are possible. For example, in some embodiments, the second node 708 is maintained within the fourth conversation tree 714, but is not populated with any information by the application 508. In this example, the second node 708 is empty, thereby indicating deletion of the second e-mail message 526. Still other embodiments are possible.

Referring now back to FIG. 5, the sync module 510 then transfers the fourth conversation tree 714 to the server mapping module 512. The server mapping module 512 generates a fourth BLOB 548 that encodes the fourth conversation tree 714. The application 508 then sends a fourth response message 550 that includes the fourth BLOB 548 to the client interface 502. The client mapping module 506 decodes the fourth BLOB 548, merges the fourth conversation tree 714 with the previously modified conversation tree located in the cache memory 524 to form an updated conversation tree, and stores the updated conversation tree in the cache memory 524. In this example, absence of the second node 708 from the fourth conversation tree 714 indicates that the second e-mail message 526 has been deleted, and when the fourth conversation tree 714 is merged with the previously modified conversation tree, the client mapping module 506 removes the second node 708 from the updated conversation tree. Other embodiments are possible.

Next, when an approved user wants to view the third e-mail message 536, the mailbox module 504 accesses at least the first itemPart 604 stored within the first node 704, and the third itemPart 612 within the third node 712 of the updated conversation tree and renders the same within the third e-mail message 536. Other embodiments are possible.

Other example messaging scenarios and/or communications between the client device 202 and server device 204 within the context of the example block diagram 500 are possible as well.

Figure 8:
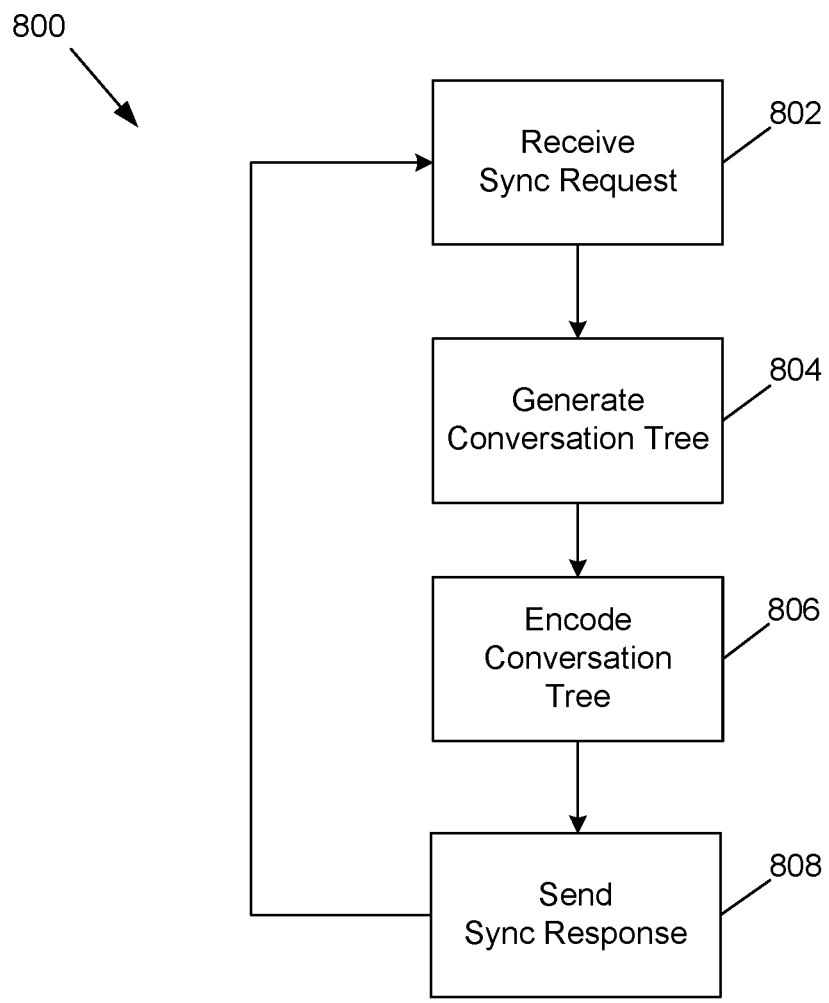
FIG. 8 shows a flowchart for a second example method for synchronizing conversation data between a client and a server.

Referring now to FIG. 8, a second example method 800 for synchronizing conversation data between a server and a client is shown. In the following example embodiment, the method 800 is at least partially implemented on or by a server computing device in a networked computing environment, such as described above in connection with FIGS. 2-7. Other embodiments are possible.

The method 800 begins at a first operation 802 at which the server receives a sync request from the client. The sync request is received at the server when the client wants to synchronize an e-mail conversation associated with a particular user's mailbox. In example embodiments, the sync request at least includes a conversation identifier that uniquely identifies the e-mail conversation. Other embodiments are possible. For example, in some embodiments, the sync request further includes an encoded conversation tree that encapsulates a most recent representation of the e-mail conversation that is stored on the client. Other embodiments are possible.

Operational flow then proceeds to a second operation 804. At the second operation 804, the server analyzes the sync request received at the first operation 802, and generates a full conversation tree that encapsulates the e-mail conversation associated with the conversation identifier. In general, the conversation tree includes at least one node that is populated with the conversation identifier that identifies the subject e-mail conversation, and a message identifier that uniquely identifies a first message associated with the conversation identifier. Other embodiments are possible. For example, in some embodiments, the at least one node further includes and an itemPart that is associated with the first message. Still other embodiments are possible.

Operational flow then proceeds to a third operation 806. At the third operation 806, the server encodes the conversation tree generated at the second operation 804 into a binary large object. However, other embodiments are possible. For example, the conversation tree can generally be encoded according to any algorithm into any format as desired for the purpose of standardization, speed, secrecy, security, compression, etc.

Operational flow then proceeds to a fourth operation 808 at which the server sends a sync response to the client. In the example embodiment, the sync response includes at least the binary large object generated at the third operation 806. Other embodiments are possible.

Operational flow then returns to the first operation 802 for processing of a subsequent sync request as received from the client. In this manner, the example method 800 periodically or at least intermittently synchronizes conversation data of the subject e-mail conversation between the server and the client.

The example embodiments described herein can be implemented as logical operations in a computing device in a networked computing system environment. The logical operations can be implemented as: (i) a sequence of computer implemented instructions, steps, or program modules running on a computing device; and (ii) interconnected logic or hardware modules running within a computing device.

For example, embodiments of the present disclosure may be practiced via a system-on-a-chip (SOC) where each or many of the components illustrated in FIG. 2 may be integrated onto a single integrated circuit. Such an SOC device may include one or more processing units, graphics units, communication units, system virtualization units and application functionality, all of which are integrated onto a chip substrate as a single integrated circuit.

Additionally, the logical operations can be implemented as algorithms in software, firmware, analog/digital circuitry, and/or any combination thereof, without deviating from the scope of the present disclosure. The software, firmware, or similar sequence of computer instructions can be encoded and stored upon a computer readable storage medium and can also be encoded within a carrier-wave signal for transmission between computing devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for synchronizing communication data in a networked computing environment, the method comprising:
   sending a request to synchronize a first conversation of a client computing device to a server computing device in the networked computing environment, wherein the request includes a first conversation identifier and text of the first conversation;
   in response to the request to synchronize, receiving, at the client computing device from the server computing device, a first conversation tree and a first synch state, wherein the first conversation tree and the first synch state are elements of a first binary large object, and wherein the first conversation tree includes the first conversation identifier and the text of the first conversation;
   storing the first conversation tree and the first synch state at the client device;
   determining that a second conversation related to the first conversation exists and identifying a second conversation identifier and text of the second conversation;
   sending an updated request to synchronize the first conversation of the client computing device to the server computing device, wherein the updated request includes the first synch state and the first conversation tree without the text of the first conversation;
   in response to the updated request, receiving at the client computing device from the server computing device, a second synch state and a second conversation tree, which comprise elements of a second binary large object, that includes the second conversation identifier, the text of the second conversation and the first conversation identifier without the text of the first conversation; and
   merging, at the client computing device, the first conversation tree with the second conversation tree, wherein the merged conversation tree includes the first and second conversation identifiers and the texts of the first and second conversations.

2. The method of claim 1, wherein the first and second conversations are contained in one or more an e-mail messages.

3. The method of claim 1, wherein the first binary large object additionally includes first metadata identifying one or more of: a recipient address of the first conversation, a sender address of the first conversation, and a subject of the first conversation.

4. The method of claim 1, wherein the second binary large object additionally includes first metadata identifying one or more of: a recipient address of the first conversation, a sender address of the first conversation, or a subject of the first conversation, and second metadata identifying one or more of: a recipient address of the second conversation, a sender address of the second conversation, or a subject of the second conversation.

5. The method of claim 1, wherein the first conversation is represented as a first node in the second conversation tree and the second conversation is represented as a second node in the second conversation tree.

6. The method of claim 1, further comprising storing, at the client computing device, the merged conversation tree in association with the second synch state.

7. A computing device for synchronizing communication data in a networked computing environment, comprising:
   a processing unit; and
   a system memory connected to the processing unit, the system memory including instructions that, when executed by the processing unit, cause the processing unit to be operable to:
   send a request to synchronize a first conversation of the computing device to a server computing device in the networked computing environment, wherein the request includes a first conversation identifier and text of the first conversation;
   in response to the request to synchronize, receive, at the computing device from the server computing device, a first conversation tree and a first synch state, wherein the first conversation tree and the first synch state are elements of a first binary large object, and wherein the first conversation tree includes the first conversation identifier and the text of the first conversation;
   store the first conversation tree and the first synch state at the computing device;
   determine that a second conversation related to the first conversation exists and identify a second conversation identifier and text of the second conversation;
   send an updated request to synchronize the first conversation of the computing device to the server computing device, wherein the updated request includes the first synch state and the first conversation tree without the text of the first conversation;
   in response to the updated request, receive at the computing device from the server computing device, a second synch state and a second conversation tree, which comprise elements of a second binary large object, that includes the second conversation identifier, the text of the second conversation and the first conversation identifier without the text of the first conversation; and
   merge, at the client computing device, the first conversation tree with the second conversation tree, wherein the merged conversation tree includes the first and second conversation identifiers and the texts of the first and second conversations.

8. The computing device of claim 7, wherein the first and second conversations are contained in one or more e-mail messages.

9. The computing device of claim 7, wherein the first binary large object additionally includes first metadata identifying one or more of: a recipient address of the first conversation, a sender address of the first conversation, and a subject of the first conversation.

10. The computing device of claim 7, wherein the second binary large object additionally includes first metadata identifying one or more of: a recipient address of the first conversation, a sender address of the first conversation, or a subject of the first conversation, and second metadata identifying one or more of: a recipient address of the second conversation, a sender address of the second conversation, or a subject of the second conversation.

11. The computing device of claim 7, wherein the first conversation is represented as a first node in the second conversation tree and the second conversation is represented as a second node in the second conversation tree.

12. The computing device of claim 7, wherein the processing unit is further caused to store, at the client computing device, the merged conversation tree in association with the second synch state.

13. A computer readable storage medium including computer readable instructions, which when executed by the one or more processors cause a computer device to provide synchronization of communication data in a networked computing environment, comprising:
sending a request to synchronize a first conversation of a client computing device to a server computing device in the networked computing environment, wherein the request includes a first conversation identifier and text of the first conversation;
in response to the request to synchronize, receiving, at the client computing device from the server computing device, a first conversation tree and a first synch state, wherein the first conversation tree and the first synch state are elements of a first binary large object, and wherein the first conversation tree includes the first conversation identifier and the text of the first conversation;
storing the first conversation tree and the first synch state at the client device;
determining that a second conversation related to the first conversation exists and identifying a second conversation identifier and text of the second conversation;
sending an updated request to synchronize the first conversation of the client computing device to the server computing device, wherein the updated request includes the first synch state and the first conversation tree without the text of the first conversation;
in response to the updated request, receiving at the client computing device from the server computing device, a second synch state and a second conversation tree, which comprise elements of a second binary large object, that includes the second conversation identifier, the text of the second conversation and the first conversation identifier without the text of the first conversation; and
merging, at the client computing device, the first conversation tree with the second conversation tree, wherein the merged conversation tree includes the first and second conversation identifiers and the texts of the first and second conversations.

14. The computer readable storage medium of claim 13, wherein the first and second conversations are contained in one or more e-mail messages.

15. The computer readable storage medium of claim 13, wherein the first binary large object additionally includes first metadata identifying one or more of: a recipient address of the first conversation, a sender address of the first conversation, and a subject of the first conversation.

16. The computer readable storage medium of claim 13, wherein the second binary large object additionally includes first metadata identifying one or more of: a recipient address of the first conversation, a sender address of the first conversation, or a subject of the first conversation, and second metadata identifying one or more of: a recipient address of the second conversation, a sender address of the second conversation, or a subject of the second conversation.

17. The computer readable storage medium of claim 13, wherein the first conversation is represented as a first node in the second conversation tree and the second conversation is represented as a second node in the second conversation tree.

18. The computer readable storage medium of claim 13, further comprising storing, at the client computing device, the merged conversation tree in association with the second synch state.

19. A method for synchronizing communication data in a networked computing environment, the method comprising:
sending a request to synchronize a first conversation of a client computing device to a server computing device in the networked computing environment, wherein the request includes a first conversation identifier and text of the first conversation;
in response to the request to synchronize, receiving, at the client computing device from the server computing device, a first conversation tree and a first synch state, wherein the first conversation tree and the first synch state are elements of a first binary large object, and wherein the first conversation tree includes the first conversation identifier, the text of the first conversation, and wherein the first binary large object additionally includes first metadata identifying one or more of: a recipient address of the first conversation, a sender address of the first conversation and a subject of the first conversation;
storing the first conversation tree and the first synch state at the client device;
determining that a second conversation related to the first conversation exists and identifying a second conversation identifier and text of the second conversation;
sending an updated request to synchronize the first conversation of the client computing device to the server computing device, wherein the updated request includes the first synch state and the first conversation tree without the text of the first conversation;
in response to the updated request, receiving at the client computing device from the server computing device, a second synch state and a second conversation tree that includes the second conversation identifier, the text of the second conversation and the first conversation identifier without the text of the first conversation; and
merging, at the client computing device, the first conversation tree with the second conversation tree, wherein the merged conversation tree includes the first and second conversation identifiers and the texts of the first and second conversations.

* * * * *